United States Patent Office 3,214,890
Patented Nov. 2, 1965

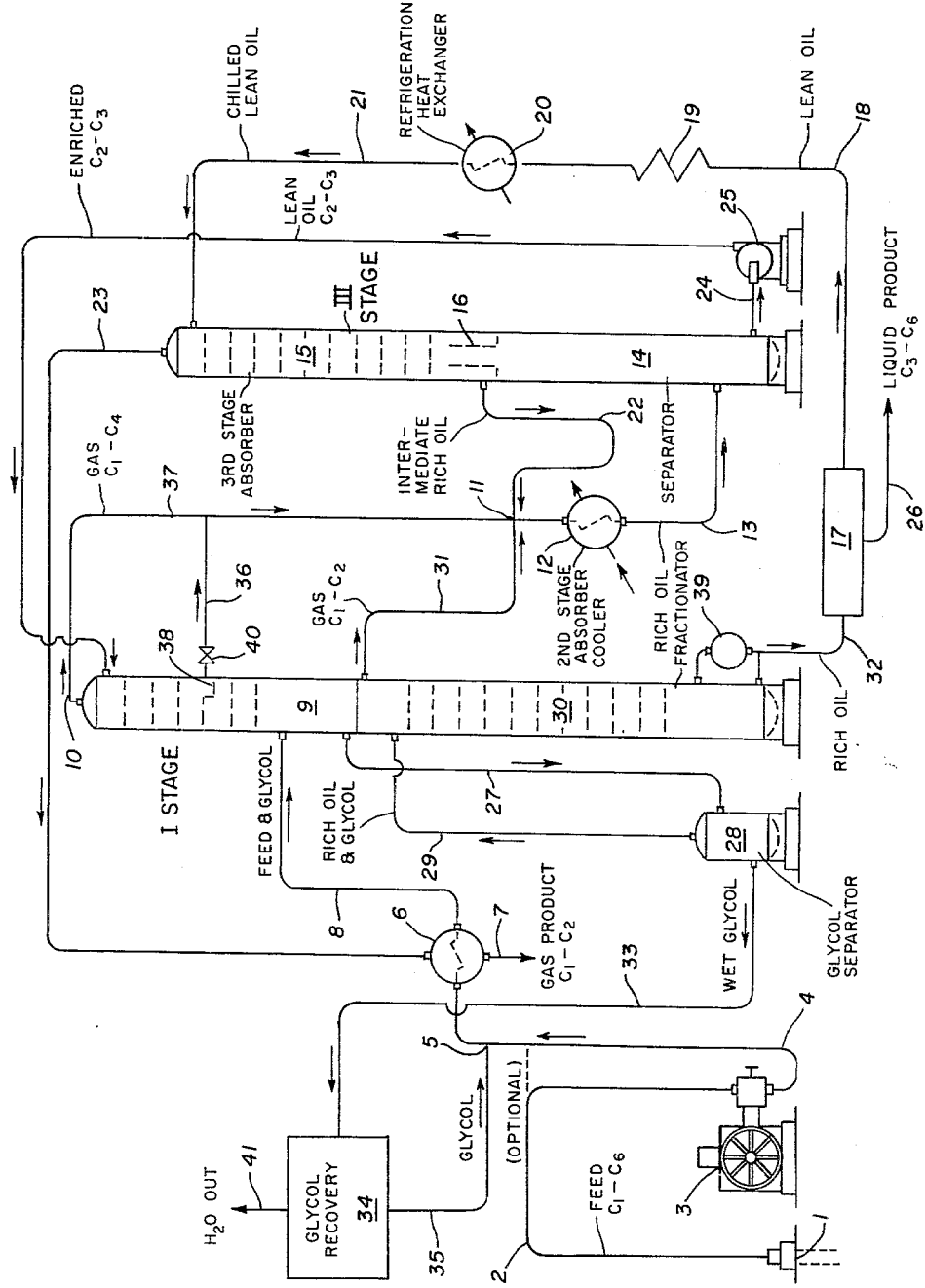

3,214,890
METHOD OF SEPARATION OF HYDROCARBONS BY A SINGLE ABSORPTION OIL
Eugene L. Sterrett, Findlay, Ohio, assignor to Marathon Oil Company, Findlay, Ohio, a corporation of Ohio
Filed Apr. 19, 1962, Ser. No. 183,059
5 Claims. (Cl. 55—40)

This invention relates to methods for recovering liquefiable hydrocarbons from a gaseous stream.

The present invention has particular application to the treatment of natural gas. It includes the discovery that an equivalent of several stages of absorption can be realized by a recycled comixed cocurrent flow of a lean oil and a rich gas through a refrigeration heat exchanger. Also, it provides a system for concentrating higher molecular weight components by a recycle method which enhances the recovery of the liquefiable components.

Heretofore, contra to the practice advocated by this invention, but as illustration, the normally practiced procedure has been to contact the rich natural gas previously chilled in a refrigeration heat exchanger by passing it countercurrent to the lean oil through a succession of bubble trays, which constitute approximately one equivalent equilibrium step for every three bubble trays. The rich natural gas being introduced into the absorber column through a bottom side connection and flowing by pressure drop up through the absorber column, contacts the lean oil on each bubble tray as the oil flows down by gravity. As the lean oil, which has previously been chilled in a refrigeration heat exchanger, flows down it absorbs components from the rich natural gas and becomes rich oil, and in so doing, the latent heat of vaporization is evolved as some of the components originally in the gaseous phase change to the liquid phase. This change of state tends to increase the absorption temperature sharply which affects absorption adversely, particularly in low temperature absorbers where the molal ratio between liquids and gases is low. This temperature rise is detrimental enough so it becomes necessary to alternately remove the liquid phase from the absorber column and chill it in a refrigeration heat exchange and return it to the absorption column.

Inasmuch as there are terms specific to the industry which must be used and their correct connotation understood for proper understanding of the practice of my invention, the meaning of these terms as used herein is as follows:

*Lean oil* is a hydrocarbon liquid used as an absorption media and circulated in contact with rich natural gas to absorb liquefiable components from the rich natural gas. The exact specifications vary throughout the industry, but generally for the lower absorption contact temperatures ranging between —20° and +20° F., an oil similar to Stoddard's solvent is used. It has a boiling range between 300° and 425° F. with an approximate average molecular weight of 130. This oil may be charged to the system or in some cases it can be accumulated from heaviest components absorbed from the rich gas.

*Rich oil* is a relative term since there are degrees of richness, but it is the lean oil after it has contacted the rich gas and has absorbed within it components from the rich natural gas. It is denuded of the absorbed components by fractionation and becomes lean oil again to be recirculated. Degrees of richness of the oil are referred to on the basis of stages assigned to the process as described hereinafter.

*Rich natural gas or rich gas* is a natural gas originating from subterranean reservoirs either out of solution from crude oil or unassociated with crude oil. It contains a mixture of individual gaseous constituents, some of which can be liquefied at atmospheric temperatures and pressures when isolated. The quantities of each component vary from one gas to another with methane as the usual majority component. Other hydrocarbon components are ethane, propane, isobutane, normal butane, isopentane, normal pentane, hexane, heptane, octane, and nonane plus in the order of increasing molecular weight ad increasing boiling temperature. Usually natural gases contain some nonhydrocarbon gaseous contaminations such as nitrogen, carbon dioxide, and hydrogen sulfide, but their presence or absence is immaterial insofar as this invention is concerned.

*Lean natural gas* is a relative term which applies to a natural gas which consists of only the lower molecular weight gaseous components; again, composed mostly of methane with varying quantities of ethane, propane and only very small traces of higher molecular weight components, if at all. In can occur naturally but generally it is the result of processing a rich natural gas in accordance with recognized industry accepted methods.

It is an object of my invention to provide a simple, economical and efficient process for recovering liquefiable hydrocarbons from a gaseous stream such as natural gas.

Another object of the invention is to provide a simple and efficient process for improving propane recovery in a low temperature absorption process utilizing procedure for concentrating the propane and ethane by a recycle circuit wherein the lean oil flows countercurrent to the gas stream over several equilibrium steps, then flows cocurrent through one equilibrium step, and finally countercurrent over several equilibrium steps.

A further object of this invention is to provide simple, efficient, and economical methods of heat exchange by direct contact, thereby reducing energy input requirements in a process for recovering liquefiable hydrocarbons.

Other objects reside in novel details of construction and novel combinations and arangements of equipment, all of which will be described in detail in the course of the description.

This invention can be applied without alteration to rich refinery gas which is similar to rich natural gas except some of its constituents are unsaturated hydrocarbons, such as propylene, as a result of cracking, also some additional nonhydrocarbon contaminants.

The variable factors contributing to high extraction of the desired higher molecular weight components (generally propane and heavier) from a rich natural gas are well known throughout the industry. However, economics have limited the application of these factors to their fullest extent. The subject invention provides a method for applying these factors much more efficiently and economically. These factors are as follows:

(1) Lower the temperature; actually an entire rich natural gas stream can be liquefied by reducing its temperature sufficiently. It is easier to accomplish liquefaction by reducing the temperature if the rich natural gas contains a high percent of high molecular weight components.

(2) Increase the pressure; this is true up to a critical limit depending on other variables such as temperature and rich natural gas composition, but generally this applies up to approximately 900 pounds per square inch pressure. This factor is generally fixed by economical considerations and cannot be varied indiscriminately for optimum liquefiable hydrocarbon recovery.

(3) Increase the molal ratio of high molecular weight hydrocarbons versus lower molecular weight hydrocarbons or in practice the ratio of lean oil to rich gas is increased. The present invention recycles high molecular weight hydrocarbons to increase this ratio.

(4) Increase the number of equilibrium steps or their equivalent. This factor applies preferentially to the higher molecular weight components becoming increasingly more effective with increasing molecular weight. The subject invention utilizes this phenomena to a distinct advantage by routing the lean oil flow properly relative to the equilibrium steps.

Any one or any combination of these factors applied properly contributes to the absorption or liquefaction and separation of the higher molecular weight hydrocarbons from a rich natural gas. These factors applied toward liquefaction of the gaseous components are more selective toward the higher molecular weight components but the lower molecular weight undesired components such as ethane and methane are liquefied to a lesser degree. It becomes a difficult problem to effect the desired segregation of components by absorption for, in disposing of undesired components from the lean oil, a portion of the desired components are forfeited. Heretofore, high extraction efficiency of propane has been difficult because of the quantities of ethane absorbed and subsequently rejected, which created an untenable recycle; but by proper control, as per this invention, this large recycle condition can be effectively and economically employed to enhance an ultimate high percentage propane recovery.

In effect, the recycled propane and ethane at a low temperature and in the liquid phase act as an absorbing media nearly as effective as additional lean oil. Ethane and propane also act as an effective refrigeration carrying media. So-called equilibrium steps is a highly theoretical approach to absorption having to do with mass transfer. For equilibrium steps to be most effectively applied, it has been thought necessary to contact the richest natural gas with the leanest oil in a relative sense. Actually, it has been found to be important to contact the gas with a maximum of the liquid phase or absorption media even though it is considered rich oil by virtue of its absorbed content of lower molecular weight components. In effect, the molal ratio of liquid phase to gaseous phase is much more important that the actual composition of the liquid phase.

This discovery, along with other novel arrangements of equipment to implement the molal ratio of liquid and gas even more, greatly enhances the absorption process.

The subject invention, in comparison with prior methods for a similar stage, differs by virtue of the sequence of equilibrium steps versus absorption temperature and gas flow relative to the oil flow and employs three distinct stages each designed for a specific optimum factor, which are arranged in the proper sequence for ultimate recovery at minimum energy input. These stages are numbered in order of flow of rich gas through them; however, it would be reverse order of flow when referred to lean oil flow. The first stage is primarily rich oil rectification by absorption of propane and higher molecular weight components and desorption or vaporization of ethane and methane. The second stage is primarily maximum absorption or liquefaction of all components in a refrigeration heat exchanger. The third stage is a clean-up absorption stage.

Starting with the third stage, chilled lean oil is circulated over the equivalent of four or five equilibrium steps countercurrent to an intermediate lean natural gas that results just prior to final release from the plant and ahead of this contact. This third stage absorption has the effect of absorbing very efficiently last traces of propane which have managed to elude liquefaction to this point. This third stage might be considered the clean-up stage and is the most efficient as to propane recovery because it is countercurrent having several equilibrium steps, contacts at minimum temperatures for both the oil and the gas and, due to the relative lean gas at this point, the heat of absorption does not increase the mean effective absorption temperature unduly. The gas evolving from this third stage is final plant residue lean gas denuded of liquefiable components insofar as the process is capable.

The intermediate rich oil resulting from the third stage flows by gravity into the refrigeration absorption heat exchange or second stage absorption commingled with the gas evolved from the first stage of absorption and rich oil stabilization. This gas, which is concentrated to a high degree with ethane and propane flows cocurrent through the refrigeration absorption stage having one effective equilibrium step at the low refrigerated isothermal temperature. It is isothermal since the heat of absorption is removed through the heat exchange tubes as rapidly as it manifests by refrigeration. One equilibrium step is very effective toward total liquefaction in this stage because of the low average temperature and high relative concentration of propane and ethane in the gas feed to it. One equilibrium step is more selective toward ethane and methane than toward propane which is optimum for this stage in that it results in maximum total liquefaction even though a good portion of the liquefied components are methane and ethane rather than the desired products. The rich oil resulting from this second stage containing much liquefied methane and ethane, and at the low refrigerated temperature of +20° to −20° F. is circulated with a pump countercurrent to the inlet rich gas over two or three equilibrium steps.

To this point, the inlet gas has only been cooled by virtue of the back heat exchange with the cold lean gas so it is relatively warm, +75 to +50° F., when entering this first stage. The countercurrent flow of the warm inlet rich gas to the cold rich oil revaporizes a large amount of methane and ethane from the rich oil which refrigerates the inlet rich gas by direct contact. The two or three equilibrium steps countercurrent flow tend to be more selective toward the absorption or liquefaction of propane and higher molecular weight components than for the methane and ethane components. The concentration of propane and higher molecular weight components have been increased by recycle from the other two stages which enhances liquefaction of the propane and higher molecular weight components. The warm inlet rich gas goes into the bottom of the section of this first stage and the cold rich oil flows from top down. In this countercurrent flow the rich oil is warmed by the rich inlet gas as the gas is refrigerated. The rich oil is rectified by this heating as well as by preferential absorption because of the number of equilibrium steps. Thus, the rich oil from this first stage is partially rectified which reduces the fractionation load for de-ethanization for commercial propane production.

The practice of the present invention will be best understood by reference to the accompanying drawing containing a flow sheet representation of a typical plant installation utilizing the novel features of the invention. The equipment represented in the flow sheet, except in the details which will be fully described, is conventional equipment now used in the industry, for which reason construction details are not shown.

As shown in the flow sheet, a gaseous stream from a suitable source of supply, such as natural gas mixtures as produced from a well 1 is conducted through a line 2 directly to a processing plant, if under sufficient pressure as represented by the optional flow path in dash lines, or it may be compressed at a compressor station 3 to a pipeline pressure within the range of 200–800 pounds per square inch gauge. This inlet gas after compression is cooled at this station by conventional methods to a temperature of approximately 80° F. and then passes into a line 4 into which glycol is introduced at 5 for mixing with the gas before it discharges from line 4 into a back heat exchange cooler 6 where it is further cooled by back heat exchange with cooled lean gas directed through tubes in cooler 6 after which the finally processed residue gas is discharged from the plant in a line 7. As the entering gas mixture passes through the back exchange cooler 6, the glycol absorbs water from the hydrocarbon mixture to such a degree that freezing or hydrate formation is prevented. The product discharge through line 7 is detailed in Table I.

The mixture of fluids discharging from back heat exchange cooler 6 at a temperature of approximate ranging between 60°–30° F., depending on the refrigeration temperature in the subsequent process, comprises uncondensed gaseous hydrocarbons, condensed liquid hydrocarbons, and a glycol, in this case diethylene glycol diluted with water. This mixture passes from the back exchange cooler 6 through a line 8 into first stage absorber 9 where it passes countercurrent upward through a succession of 6 to 10 conventional bubble trays which are an equivalent of 2 to 3 equilibrium steps. In its passage upwardly through the bubble trays, the gas contacts rich oil recycled from a subsequent stage, as will be described hereinafter, wherein components and heat are exchanged between the vapor and liquid.

The natural gas flows from first stage absorber 9 through a line 10 to a junction point 11 where rich oil and rich gas originating from other internal cycles, as will be described herein later, are commingled with the stream to comprise the feed to a second stage absorber refrigeration heat exchange 12. This combined stream of rich oil and rich gas flows cocurrent through the second stage absorber refrigeration heat exchanger 12, which is the equivalent of one equilibrium step, and out through a line 13 into a separator 14 which is the bottom section of one vessel comprised of the bottom separator section 14 and a top absorber section 15. The less rich gas separated from the liquid in separator 14 passes through a chimney tray 16 into the third stage absorber 15 section and upward countercurrent through 12 to 15 conventional bubble trays which are equivalent to 4 to 5 equilibrium steps. The gas having become lean gas passes from the third stage absorber 15 into a line 23 to back heat exchange cooler 6, and then into a line 7 to complete the process as far as the gas is concerned.

Now, following the lean oil and rich oil cycle, it starts as lean oil from the factionation block 17 through a line 18, into a conventional cooler 19, a refrigeration heat exchanger 20 where it is refrigerated to a temperature ranging beween +20° to –20° F., through line 21 and into the top of third stage absorber 15. Lean oil to this point, it begins to be rich oil as it flows downward by gravity over the bubble trays contacting the gas and absorbing components from it. The rich oil trapped by chimney tray 16 and routed through a line 22 which has a vertical loop in order to form a liquid seal to prevent bypass flow of gas from line 10. The loop in line 22 must provide enough liquid head to overcome the flowing pressure drop through second stage absorber refrigeration heat exchanger 12. The rich oil commingles with the gas of line 10 at point 11 and passes through the second stage absorber refrigeration heat exchanger 12, into line 13 and into separator 14.

In separator 14 the second stage rich oil is separated from the third stage rich gas and flows through line 24 into pump 25. Pump 25 pumps this rich oil through line 24 into the top of first stage absorber 9. The second stage rich oil flows downward over the bubble trays in absorber 9 contacting the first stage rich gas and exchanging components and heat with the gas and becoming first stage rich oil. The first stage rich oil combines with the glycol from line 8 in the bottom of absorber 9 and flows together with the glycol through line 27 into glycol separator 28. In glycol separator 28 the first stage rich oil, being immiscible with the glycol, separates and flows from the top of glycol separator 28 through line 29 into rich oil stabilizer 30. The first stage rich oil is conventionally fractionated in stabilizer 30 which is a distillation column and drives off low melcular weight components from the top of the stabilizer 30 into line 31 which joins with line 10 at point 11. The stabilized rich oil before passing from stabilizer 30 is subjected to fractionation by heat exchange through the provision of a reboiler 39 receiving heat input from an external source of hot fluid (not shown). The rich oil flows through line 32 into the conventional fractionation block 17. In fractionation block 17 the absorbed components are fractioned from the rich oil becoming lean oil again and repeat the lean oil cycle starting through line 18. The components separated from the lean oil in fractionation block 17 flow through line 26 to storage as liquefied products of the process. The contents of the outflow in line 26 are shown in accompanying Table I.

Stabilizer 30 could have been lumped into fractionation block 17 but to illustrate the preferred arrangement for flow of stripped vapor back in line 31 and the structural relationship of absorber 9 to the stabilizer 30 this method was employed. By having absorber 9 above stabilizer 30, the rich oil flows by gravity and by operating stabilizer 30 at the same pressure as the rest of the system a recompressor is not required. Caution must be exercised in this procedure to be sure the bottom temperature which is determined by the operating pressure does not exceed the critical temperature for the hydrocarbon liquid mixture at that point.

The glycol separated in glycol separator 28 returns through line 33 to the conventional glycol regenerator 34 represented only as a rectangle. The glycol is regenerated in glycol regenerator 34 by removing excess water through a discharge line 41 while the regenerated glycol returns to repeat the cycle through absorber 9 joining the gas system at point 5 through line 35.

Depending upon the richness of the inlet gas and separating temperatures and pressures, it is frequently an advantage to create a recycle within a recycle to cause even a greater buildup of intermediate components and lean oil. This recycle begins with a trap-out tray 38 in the first stage absorber 9 where only a portion of the liquid on the tray is drawn off through line 36 and flowed into line 10 at point 37. This recycle stream follows the hereinabove described flow from point 37 in line 10. The amount of liquids taken from trap-out tray 38 is determined by a conventional rate of flow control in line 36 represented by the valve 40. The amount of flow through line 36 can only be increased slowly to allow the recycle to build up before more is added. It is conceivable to build this recycle up an infinite amount. Other than the physical limitations of equipment such as pump 25 and refrigeration heat exchanger 12, there would be no purpose served to increase this secondary recycle beyond the amount required for optimum recovery of liquefiable hydrocarbons. The optimum recycle would be determined from operating gas analysis.

As an illustration only, a typical rich natural gas composition was selected and the process material balance calculated by thermodynamic and chemical engineering principles for an operating pressure of 500 p.s.i.a. for the entire system of vessels and a refrigerated temperature level of zero degrees Fahrenheit. Table I constitutes a summary of these calculations. For the lean oil rate selected, 2,130 mols per day, 90%+ propane recovery is attained. The rectification and refrigeration function of the first stage absorber is illustrated by comparing the composition of line 27 to line 24. The ethane content of line 24 changes from 3,253 mols per day to 1,938 mols per day in line 27. The difference or 1,315 mols per day represents recycled ethane and refrigeration by direct contact in the first stage absorber 9.

The maximum liquefaction of second stage absorber 12 is noted by the total of 10,399 mols from a relative lean gas to it. The selectively of the second stage absorber 12 toward propane is not great because of its single equilibrium step, but the third stage absorber 15 compensates for this shortcoming by catching this slop over. The sequence of these absorption stages complement each other for utlimate high propane and heavier molecular components recovery.

While the cyclic system of my invention is intended primarily for use in plants treating natural gas, it may be used in the treatment of liquefiable hydrocarbons from other sources having components in the range of methane to nonane, and the expression "natural gas or the like" is used in this specification to designate all such compositions. The system in entirety utilizes three absorber stages as noted in the preceding description, but as there are some novel control relationships between the first absorber stage 9 of the flow sheet and the last absorber stage 15, the latter may be referred to in claim definitions as a "second absorber stage" when the functioning of the second stage absorber 12 is not required in the definition.

As the equipment components of the system are known and widely used in this art, symbolic representation has been employed without attempt to illustrate the actual structural details. Changes and modifications may be availed of within the spirit and scope of the invention as defined in the hereunto appended claims.

riched in the higher molecular weight hydrocarbons from said feed mixture and including residual lower molecular weight hydrocarbons and a first low molecular weight hydrocarbon enriched gas, distilling in a distillation stage said first absorber oil to separate said residual low molecular weight hydrocarbons and a first low molecular weight hydrocarbon enriched gas, distilling in a distillation stage said first absorber oil to separate said residual low molecular weight hydrocarbons as a second low molecular weight hydrocarbon enriched gas from a second absorber oil including said liquefied higher molecular weight hydrocarbons from said feed mixture, passing said second absorber oil through a separating stage to produce a product of higher molecular weight hydrocarbons from said feed mixture and lean absorber oil, mixing said first and second lower molecular weight hydrocarbon

TABLE I

*Mols per day*

|  | Line 2 | Line 7 | Line 10 | Line 27 | Point 11 | Line 24 | Chimney Tray 16 | Line 22 | Line 31 | Line 32 | Line 26 | Line 18 |
|---|---|---|---|---|---|---|---|---|---|---|---|---|
| Methane | 24,260 | 24,260 | 24,532 | 1,798 | 27,212 | 2,070 | 25,142 | 882 | 1,798 | | | |
| Ethane | 4,880 | 4,649 | 6,195 | 1,938 | 9,051 | 3,253 | 5,798 | 1,149 | 1,707 | 231 | 231 | |
| Propane | 3,930 | 374 | 2,839 | 3,929 | 4,083 | 2,838 | 1,245 | 871 | 373 | 3,556 | 3,556 | |
| Iso-butane | 583 | | 58 | 603 | 91 | 78 | 13 | 13 | 20 | 583 | 583 | |
| Normal butane | 1,195 | | | 1,223 | 32 | 28 | 4 | 4 | 28 | 1,195 | 1,195 | |
| Iso-pentane | 135 | | | 136 | 1 | 1 | | | 1 | 135 | 135 | |
| Normal pentane | 363 | | | 364 | 1 | 1 | | | 1 | 363 | 363 | |
| Hexane plus | 350 | | | 350 | | | | | | 503 | 350 | |
| Lean oil | | | | 2,130 | | 2,130 | | 2,130 | | 2,130 | | 2,130 |
| | 35,696 | 29,283 | 33,624 | 12,471 | 42,601 | 10,399 | 32,202 | 5,049 | 3,928 | 8,543 | 6,413 | 2,130 |

I claim:

1. In a cyclic method for the treatment of a mixture of gases including hydrocarbons in the range of methane to nonane, the steps of contacting in a first stage such a feed mixture in countercurrent relation with an absorber oil which is a lean oil of hydrocarbons having a higher molecular weight than the feed mixture and liquefied fractions of higher molecular weight hydrocarbons of said feed mixture to produce a first absorber oil enriched in the higher molecular weight hydrocarbons from said feed mixture and including residual lower molecular weight hydrocarbons and a first low molecular weight hydrocarbon enriched gas, distilling in a distillation stage said first absorber oil to separate said residual low molecular weight hydrocarbons as a second low molecular weight hydrocarbon enriched gas from a second absorber oil including said liquefied higher molecular weight hydrocarbons from said feed mixture, passing said second absorber oil through a separating stage to produce a product of higher molecular weight hydrocarbons from said feed mixture and lean absorber oil, mixing said first and second lower molecular weight hydrocarbon enriched gases with an intermediate rich oil from a third stage, passing the resultant mixture through a cooling absorption second stage, passing the resultant cooled mixture from said absorption stage to a separating stage to separate a gas product rich in low molecular weight hydrocarbons and said absorber oil, passing said separated gas product from said separating stage in countercurrent relation in said third stage with lean absorber oil from said separation stage to produce a gas product of the low molecular weight hydrocarbons in said feed mixture and said intermediate rich oil, and passing the resulting said absorber oil from said separating stage into said first stage as the absorber oil.

2. In a cyclic method for the treatment of a mixture of gases including hydrocarbons in the range of methane to nonane, the steps of dehydrating and cooling such a feed mixture, contacting the resulting dehydrated and cooled mixture in a countercurrent relation with an absorber oil which is a lean oil of hydrocarbons having a higher molecular weight than the feed mixture and liquefied fractions of higher molecular weight hydrocarbons of said feed mixture to produce a first absorber oil en- 3. In a cyclic method for the treatment of a mixture of gases including hydrocarbons in the range of methane to nonane, the steps of dehydrating a feed mixture, contacting in a first stage the resulting dehydrated mixture in countercurrent relation with an absorber oil which is a lean oil of higher molecular weight than the feed mixture and higher molecular weight hydrocarbons from said feed mixture to produce a first absorber oil which is lean oil enriched with higher molecular weight hydrocarbons from said feed mixture and having residual low molecular weight hydrocarbons and a first low molecular weight hydrocarbon enriched gas, distilling in a distillation stage the resulting absorber oil from the first stage to separate as a gas said residual low molecular weight hydrocarbons from said lean oil enriched with higher molecular weight hydrocarbons from said feed mixture, separating lean oil and a product of the higher molecular weight hydrocarbons from said lean oil and higher molecular weight hydrocarbons from said distillation stage in a separation stage, passing said lean oil from said separation stage into a second stage, withdrawing an intermediate absorber oil mixture from an intermediate point in said second stage, combining and cooling the withdrawn liquid from said second stage with the gases from said first and distillation stages to absorb heavier components of said gases, passing said combined mixture into a cooling absorption second stage, passing the resultant cooled mixture into a separation stage to separate as a product a second gas enriched with low molecular weight hydrocarbons from said feed mixture and said intermediate absorber oil and said absorber oil, separating gas in said second stage and passing it in countercurrent contact in said second stage with lean oil resulting from the separating stage, and passing said separated absorber oil of higher molecular weight hydrocarbons and lean oil to said first stage as said absorber oil.

4. In a cyclic method for the recovery of a propane enriched gas from a feed mixture of natural gas containing hydrocarbons in the range of methane to hexane, the steps of dehydrating said feed mixture, contacting the resulting dehydrated mixture in countercurrent contacting relation with a first absorber oil which is a lean oil of higher molecular weight than said feed mixture and hydrocarbons from said feed mixture including propane, ethane and a minor portion of methane in a first stage to produce a first liquid fraction and a first gas enriched with methane and ethane, distilling in a distillation stage said first liquid fraction to separate a second gas enriched with methane and ethane from said first liquid fraction and produce a second absorber oil fraction enriched in propane, mixing said first and second gases with an intermediate absorber oil from a third stage, passing the resulting mixture of said first and second gases and intermediate absorber oil to a cooling absorption stage to absorb heavier components from said gases, separating gases from said mixture, separating a propane enriched liquid hydrocarbon fraction from said second absorber oil from said distillation stage to produce a lean oil, cooling said lean oil, passing the resulting cooled lean oil into said third stage in countercurrent contacting relation with said separated gases from said first and distillation stages to produce as a gas product methane and ethane and lean oil enriched with propane, ethane and a minor portion of methane, and passing the resulting lean oil enriched in propane, ethane and a minor portion of methane from said third stage as said absorber oil to the first stage.

5. In a cyclic method for the recovery of a propane enriched product from a feed mixture of gases containing hydrocarbons in the range of methane to hexane, the steps of dehydrating said feed, contacting the resulting dehydrated feed in countercurrent contacting relation with an absorber oil which is a lean oil of higher molecular weight than said feed and enriched in propane, ethane and a minor portion of methane in a first stage to produce a first absorber oil and a first gas enriched with methane and ethane, distilling in a distillation stage said first absorber oil to separate a second gas enriched with methane and ethane from a second absorber oil enriched in propane, mixing said first and second gases with an intermediate absorber oil from a third stage, passing the resulting mixture to a cooling and absorption stage to absorb heavier components from said gases; passing the resultant cooled mixture to a second stage to separate a third gas and said absorber oil, separating in a separator stage a propane enriched product fraction from said second absorber oil and to produce a lean oil, passing the resulting lean oil from said separator stage into said third stage in countercurrent contacting relation with said third gas, withdrawing said intermediate absorber oil from an intermediate point in said third stage for mixing with said first and second gases, passing from said second stage the resulting absorber oil rich in liquid propane and ethane as said absorber oil to the first stage, and recovering from said third stage a methane and ethane product.

References Cited by the Examiner
UNITED STATES PATENTS

| | | | |
|---|---|---|---|
| 2,117,548 | 5/38 | Drennen | 208—344 |
| 2,290,957 | 7/42 | Hachmuth | 208—344 |
| 2,388,048 | 10/45 | Garrison et al. | 55—48 X |
| 2,596,785 | 5/52 | Nelly et al. | 55—56 X |
| 2,620,895 | 12/52 | Turner | 55—32 |
| 2,690,814 | 10/54 | Reid | 55—32 |
| 2,765,635 | 10/56 | Redcay | 55—56 X |
| 2,806,552 | 9/57 | Kobie | 55—48 X |
| 2,812,830 | 11/57 | Sattler et al. | 55—31 |
| 2,821,502 | 1/58 | Gillette et al. | 55—56 X |
| 2,849,371 | 8/58 | Gilmore | 55—48 X |
| 2,880,591 | 4/59 | Kwauk | 55—49 X |
| 2,996,142 | 8/61 | Worley | 55—49 X |
| 3,069,829 | 12/62 | Worley | 55—48 X |

REUBEN FRIEDMAN, *Primary Examiner.*

UNITED STATES PATENT OFFICE
CERTIFICATE OF CORRECTION

Patent No. 3,214,890            November 2, 1965

Eugene L. Sterrett

It is hereby certified that error appears in the above numbered patent requiring correction and that the said Letters Patent should read as corrected below.

Column 1, line 13, for "comixed" read -- commixed --; column 2, line 8, for "ad" read -- and --; column 3, line 38, for "that" read -- than --; column 5, line 37, for "factionation" read -- fractionation --; columns 7 and 8, TABLE I, eleventh column, line 8 thereof, for "503" read -- 350 --; column 8, lines 4 to 7, strike out "distilling in a distillation stage said first absorber oil to separate said residual low molecular weight hydrocarbons and a first low molecular weight hydrocarbon enriched gas,".

Signed and sealed this 10th day of January 1967.

(SEAL)

Attest:

ERNEST W. SWIDER  
Attesting Officer

EDWARD J. BRENNER  
Commissioner of Patents